US011523704B1

(12) United States Patent
Dos Santos et al.

(10) Patent No.: US 11,523,704 B1
(45) Date of Patent: Dec. 13, 2022

(54) INGREDIENT CARTRIDGE FOR A FLUID MIXTURE DISPENSING DEVICE

(71) Applicant: Cana Technology, Inc., Redwood City, CA (US)

(72) Inventors: Kristopher Bernardo Dos Santos, San Francisco, CA (US); Gregory Allen Springer, Los Altos, CA (US); Elijah S. Kashi, San Francisco, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/551,581

(22) Filed: Dec. 15, 2021

(51) Int. Cl.
| | | |
|---|---|---|
| *B22C 5/00* | (2006.01) | |
| *A47J 31/44* | (2006.01) | |
| *A47J 31/58* | (2006.01) | |
| *A47J 31/60* | (2006.01) | |
| *B01F 23/451* | (2022.01) | |
| *B01F 25/23* | (2022.01) | |
| *A47J 43/07* | (2006.01) | |
| *B01F 25/00* | (2022.01) | |

(52) U.S. Cl.
CPC ........... *A47J 31/4403* (2013.01); *A47J 31/58* (2013.01); *A47J 31/60* (2013.01); *A47J 43/07* (2013.01); *B01F 23/451* (2022.01); *B01F 25/23* (2022.01); *B01F 2025/919121* (2022.01)

(58) Field of Classification Search
CPC .................. B01F 2025/919121; A47J 42/40
See application file for complete search history.

(56) References Cited

U.S. PATENT DOCUMENTS

| | | | | |
|---|---|---|---|---|
| 9,364,114 B2 * | 6/2016 | Claesson | ............... | B67D 1/0021 |
| 9,394,154 B2 * | 7/2016 | Connerat | ................. | B65D 5/72 |
| 9,675,204 B2 * | 6/2017 | Cahen | ................. | A47J 31/4403 |
| 10,604,394 B1 | 3/2020 | Cazeneuve et al. | | |

(Continued)

FOREIGN PATENT DOCUMENTS

| | | | | |
|---|---|---|---|---|
| CN | 206213881 U | 6/2017 | | |
| EP | 3158900 A1 * | 4/2017 | .......... | A47J 31/3638 |

(Continued)

OTHER PUBLICATIONS

Google machine translation for "EP-3158900-A1" (Year: 2017).*
Google machine translation for "FR-3013036-A1" (Year: 2015).*

*Primary Examiner* — Anshu Bhatia
*Assistant Examiner* — Gregory Y Huan
(74) *Attorney, Agent, or Firm* — Daylight Law, P.C.

(57) ABSTRACT

Ingredient cartridges and associated fluid mixture dispensing devices are disclosed herein. An ingredient cartridge can include a recyclable fluid storage portion, a recyclable shell at least partially surrounding the recyclable fluid storage portion, and a sturdy portion attached to the recyclable shell and having a device mating interface for a cartridge mating interface on the fluid mixture dispensing device. The cartridge mating interface can be a sliding cartridge mating interface meant to interface with a cartridge that slides into the device. The sliding cartridge mating interface can include a first anchor for receiving a mating interface of a cartridge, a second anchor for receiving a mating interface of the cartridge, and a rail surface. The first anchor and the second anchor can extend from the rail surface. The first anchor and the second anchor can be the tallest protrusions on the rail surface.

20 Claims, 5 Drawing Sheets

(56) References Cited

U.S. PATENT DOCUMENTS

| | | | |
|---|---|---|---|
| 2003/0214874 A1* | 11/2003 | Hlavinka | B01F 33/05 366/214 |
| 2008/0029541 A1 | 2/2008 | Wallace et al. | |
| 2012/0248117 A1* | 10/2012 | Corbett | B65D 77/06 220/737 |

FOREIGN PATENT DOCUMENTS

| | | | | |
|---|---|---|---|---|
| FR | 3013036 A1 * | 5/2015 | | B01F 11/0065 |
| WO | WO-2021028654 A2 * | 2/2021 | | B01F 15/0212 |

* cited by examiner

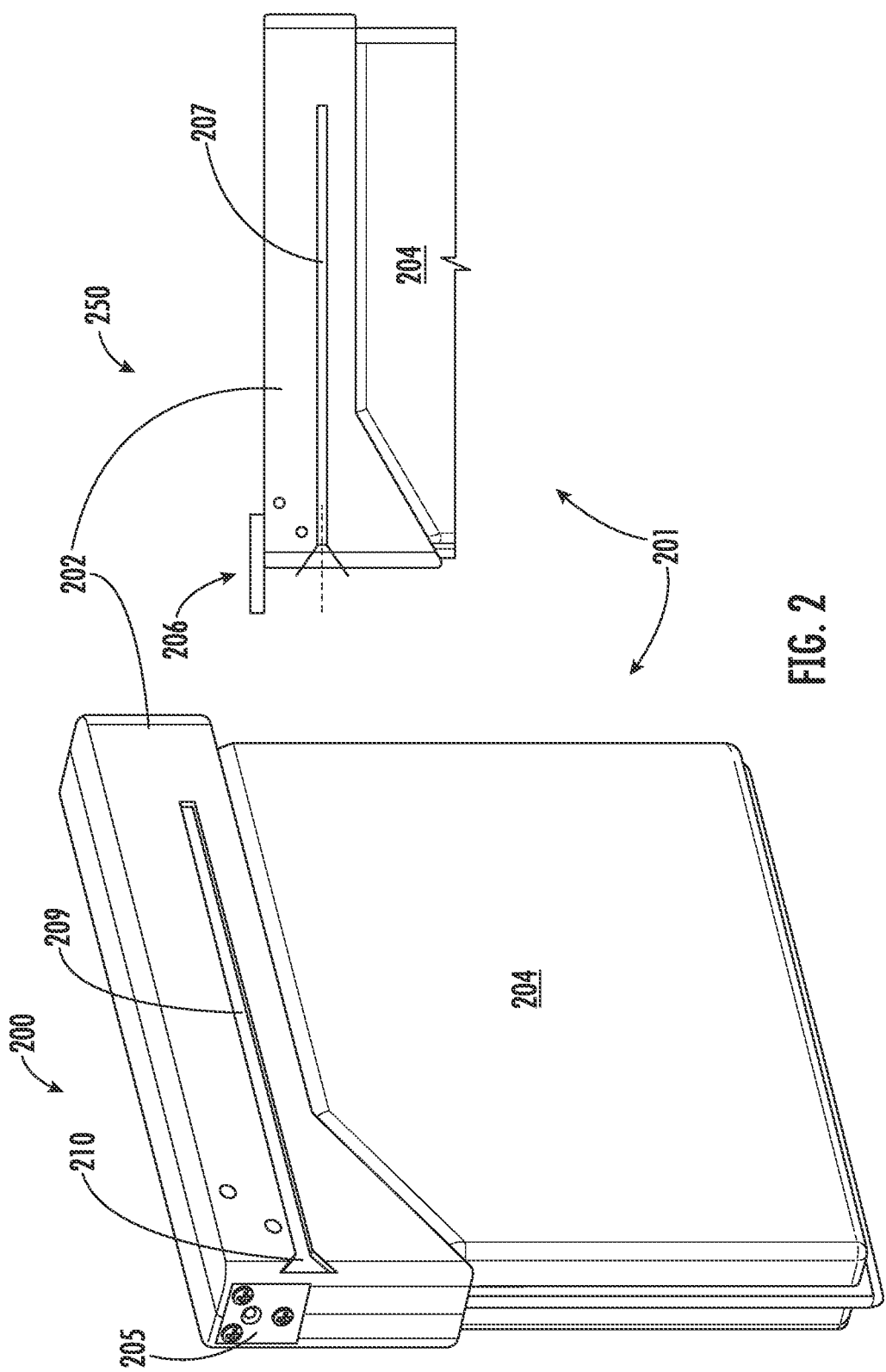

INGREDIENT CARTRIDGE FOR A FLUID MIXTURE DISPENSING DEVICE

BACKGROUND

Fluid mixture dispensing devices are widely used and generally involve the mixing of various ingredients into a fluid to be dispensed. For example, beverage dispensers such as traditional soda fountains mix a variety of concentrated syrups with carbonated water to dispense a variety of sodas. As another example, at home beverage dispensers such as flavored coffee machines mix coffee from disposable flavor pods with heated still water or milk to produce a beverage. Fluid mixture dispensing devices located in a home or commercial setting have the potential to provide significant benefits to the environment in that multiple beverages can be dispensed into reusable vessels and do not need to be individually packaged or bottled. However, these benefits can be offset if the various ingredients used by the fluid mixture dispensing devices are individually packaged and are not reusable. For example, pods for flavored coffees are generally consumed on a per beverage basis and are disposed of after a single use.

SUMMARY

This disclosure relates generally to fluid mixture dispensing devices and methods, and more specifically to ingredient cartridges for fluid mixture dispensing devices. In specific embodiments of the invention, an ingredient cartridge for a fluid mixture dispensing device comprises several portions with different degrees of reduction, reusability, and recyclability. Such an ingredient cartridge can include a sturdy portion that is configured for handling or for mating with the fluid mixture dispensing device. The sturdy portion can be made of durable materials that have a high degree of reusability. Such an ingredient cartridge can also include other portions that are less sturdy but that are significantly reduced or have a high degree of recyclability. For example, such an ingredient cartridge can have an ingredient storage portion that is in contact with and stores the ingredient. Alternatively, or in combination, such an ingredient cartridge can include a shell portion that at least partially surrounds such an ingredient storage portion. The ingredient storage portion can be a reduced element and can optionally also have a high degree of recyclability. The optional shell portion can have a high degree of recyclability or a high degree of reusability. Using various combinations of these approaches, specific embodiments of the invention provide an ingredient cartridge with a high degree of functionality and reliability along with a minimal environmental impact.

As used herein, the terms "recyclability," "reduction," and "reusability" can be explained with reference to the functionality of an ingredient cartridge when used with a fluid mixture dispensing device. The ingredient cartridges disclosed herein are intended to be provided to the end user of a fluid mixture dispensing device, mated with the fluid mixture dispensing device, used to the point of full depletion, and then removed from the device for refilling. Portions of the ingredient cartridge that have a "high degree of reusability" are those portions which can be used through many cycles of depletion and refilling. In this sense, different portions of the cartridge may have different levels of reusability because the cartridges can be disassembled for specific portions to be retired while additional portions remain in use. Portions of the cartridge which may be removed from the remainder of the cartridge and used separately can be referred to as "detachable" portions. In this sense, detachable means that a portion can be reliably separated from alternative portions without damage to the portion. Portions of the ingredient cartridge that have a "high degree of recyclability" are those portions which can undergo a commercially viable recycling process which results in the recovery of a high percentage of the recycled material for additional use with minimal energy requirements or harmful externalities. Portions of the ingredient cartridge that are "reduced" or have a high "degree of reduction" generally do not include a large amount of material when compared to other components that could serve a similar purpose in a similar design and application. As used herein a portion of a cartridge is "sturdy" if it can maintain its structural integrity in response to forces which are repeatedly imparted on it by end users during daily handling.

In specific embodiments of the invention, an ingredient cartridge for a fluid mixture dispensing device includes a device interface configured to mate with a sliding cartridge mating interface on the fluid mixture dispensing device. The sliding cartridge mating interface can be designed to guide an ingredient cartridge into alignment and form an air-tight interface with the fluid mixture dispensing device. The device interface on the cartridge, that is designed to mate with the sliding cartridge mating interface on the device, can be a sturdy portion of the ingredient cartridge with a high degree of reusability. The sliding cartridge mating interface can be configured to greatly reduce the precision required, from a user perspective, to form the air-tight interface.

In specific embodiments of the invention, an ingredient cartridge for a fluid mixture dispensing device is provided. The ingredient cartridge comprises a recyclable fluid storage portion, a recyclable shell at least partially surrounding the recyclable fluid storage portion, and a sturdy portion attached to the recyclable shell and having a device mating interface for a cartridge mating interface on the fluid mixture dispensing device.

In specific embodiments of the invention, a fluid mixture dispensing device is provided. The fluid mixture dispensing device comprises an ingredient cartridge. The ingredient cartridge comprises a recyclable fluid storage portion, a recyclable shell at least partially surrounding the recyclable fluid storage portion, and a sturdy portion attached to the recyclable shell and having a device mating interface. The fluid mixture dispensing device comprises a cartridge mating interface mated to the device mating interface, and a controller programmed to cause an ingredient to flow from the ingredient cartridge through the cartridge mating interface.

In specific embodiments of the invention, a sliding cartridge mating interface on a fluid mixture dispensing device is provided. The sliding cartridge mating interface comprises a first anchor for receiving a mating interface of a cartridge, a second anchor for receiving the mating interface of the cartridge, and a rail surface. The first anchor and the second anchor extend from the rail surface. The first anchor and the second anchor are the tallest protrusions on the rail surface.

BRIEF DESCRIPTION OF THE DRAWINGS

FIG. 2 illustrates an example of an ingredients cartridge for a fluid mixture dispensing device, in accordance with specific embodiments disclosed herein.

In the Figures, like reference numbers correspond to like components unless otherwise stated.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods associated with an ingredient cartridge for a fluid mixture dispensing device will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1A:
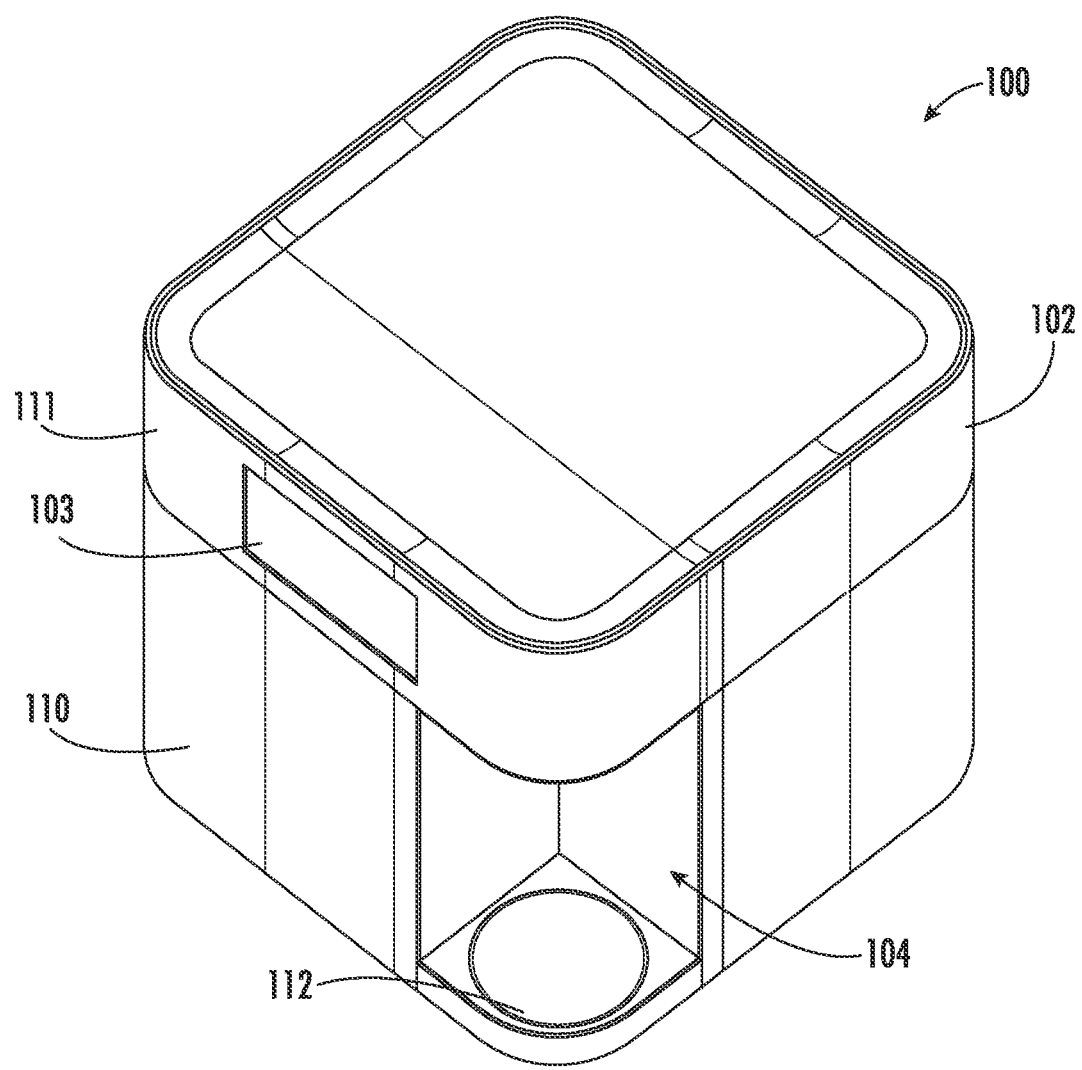
FIG. 1A illustrates an example of a fluid mixture dispensing device, in accordance with specific embodiments disclosed herein.

FIG. 1A illustrates an example of a fluid mixture dispensing device 100, in accordance with specific embodiments disclosed herein. The fluid mixture dispensing device 100 can be any of the fluid mixture dispensing devices described in U.S. Provisional Patent Application No. 63/146,461 filed Feb. 5, 2021, and U.S. patent application Ser. No. 17/547,081 filed Dec. 9, 2021, all of which are incorporated by reference herein in their entirety for all purposes.

The fluid mixture dispensing device 100 can include a casing, such as casing 102, that can house various internal components of the device. The casing 102 can include various accesses to the interior of the device. The accesses can be in the form of doors, such as upper access door 111 and lower access door 110. The accesses can also be removable portions, such as lids or walls of the casing. The accesses can be configured so that a user of the device can access at least part of the interior of the device, for example to replace a component, to clean the device, etc., as will be described below in more detail.

The fluid mixture dispensing device can also include a user interface, such as user interface 103. The user interface 103 can include any means for outputting information from the device to a user of the device, and for inputting information from the user of the device to the device. In this way, the user interface can include any means that facilitate the interaction of a user of the device with the device, including but not limited to a display, a speaker, a microphone, a camera, various sensors such as light and presence sensors, etc. For example, the user interface can include a touch screen display, so that the device can display information for the user via the display, and the user can provide inputs to the device via the touch screen display. As another example, the interaction between the user and the device can be via auditory cues provided by the device via a speaker and voice commands from the user received via a microphone. As another example, the device can recognize user facial expressions and gestures via cameras and sensors. The user interface components can be associated to a controller of the device so that the controller can administrate the information to be outputted and process the information being received.

The fluid mixture dispensing device 100 can also include a dispense area, such as dispense area 104. Dispense area 104 can be the area where a fluid mixture is dispensed out of the device 100. Dispense area 104 can be an area configured to receive a vessel or other containers to dispense a fluid mixture out of device 100. The dispense area 104 can be sized so that different containers (for example a wine glass) can be placed therein. In specific embodiments of the invention, the dispense area 104 can be adjusted, for example by using a height adjustable tray. The dispense area 104 can include a waste outlet, such as waste outlet 112. The waste outlet can be a removable waste outlet, such as a removable drip tray.

Figure 1B:
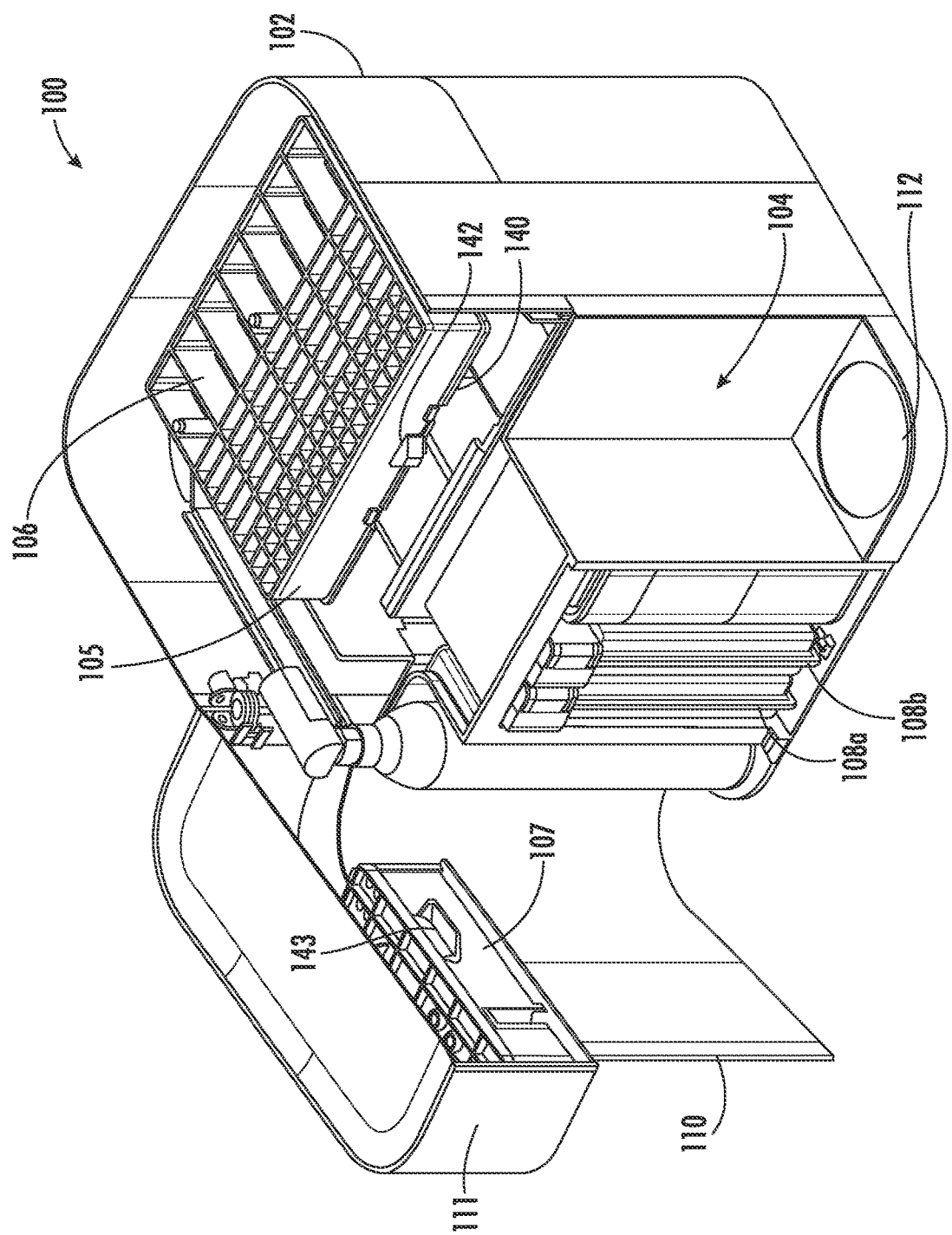
FIG. 1B illustrates exemplary internal components of a fluid mixture dispensing device, in accordance with specific embodiments disclosed herein.

FIG. 1B illustrates the fluid mixture dispensing device 100 of FIG. 1A in an open configuration to illustrate exemplary internal components that can be housed by the casing 102 of the fluid mixture dispensing device 100, in accordance with specific embodiments disclosed herein. The accesses, such as upper access door 111 and the lower access door 110, are open in this figure. The doors can be attached to the remainder of the casing via hinges or other structures. The doors can alternatively be removable doors so that they are completely removed when open. The doors can be any kind of doors such as sliding doors, and open in any direction, for example to the top or to the right of the device. Doors 111 and 110 can be separate doors or a unitary door of the device. In this example, the access doors have been represented in the front wall of the device. However, this is not a limitation of the invention. Different doors and/or any access to the interior of the device can be located anywhere on the device, and do not need to be located on the front wall. In the example of FIG. 1B, a portion of the top wall of the device 100 has been removed to expose some additional exemplary components of the device.

The fluid mixture dispensing device 100 can include one or more ingredient reservoirs, such as ingredient reservoir 106. The ingredient reservoirs can store ingredients to be used by the fluid mixture dispensing device 100 to create a fluid mixture, such as concentrated liquids (e.g., flavor syrups, salts, acids, etc.). The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes.

The ingredient reservoirs, such as ingredient reservoir 106, can be located in a cartridge, such as cartridge 105. The cartridge can be accessed via one of the accesses of the device. For example, the cartridge can be accessed through upper access door 111. In this way, a user of the device can replace the cartridge as needed. In the example of FIG. 1B, the top surface of cartridge 105 has been removed to expose the ingredient reservoirs 106. However, the cartridge can be completely encased. In specific embodiments of the invention, the cartridge includes a removable lid so that the various ingredient reservoirs can be accessed, for example to be refilled. The cartridge can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021, and U.S. patent application Ser. No. 17/545,699 filed Dec. 8, 2021, all of which are incorporated by reference herein in their entirety for all purposes.

The fluid mixture dispensing device 100 can also include one or more additional ingredient cartridges, such as ingredient cartridge 108a and ingredient cartridge 108b. Ingredient cartridge 108a and ingredient cartridge 108b differ from the cartridge storing ingredient reservoir 106 because they store a single ingredient at a higher volume that the ingredient reservoirs such as ingredient reservoir 106. These ingredient cartridges can store liquid ingredients to be used by the fluid mixture dispensing device 100 to create a fluid mixture, such as water, alcohol, etc. The ingredient cartridges can be the solvent reservoirs described in U.S. Provisional Patent Application No. 63/146,461 filed Feb. 5, 2021 and U.S. patent application Ser. No. 17/547,081 filed Dec. 9, 2021, all of which are incorporated by reference herein in their entirety for all purposes. The ingredient cartridges can be accessed via one of the accesses of the device. For example, the ingredient cartridges can be accessed through lower access door 110. In this way, a user of the device can remove the ingredient cartridges as needed, for example to replace a depleted ingredient cartridge.

The fluid mixture dispensing device 100 can be configured to create a fluid mixture by mixing one or more ingredients from one or more ingredient reservoirs 106 and/or one or more ingredients from one or more ingredient cartridges such as ingredient cartridge 108a and ingredient cartridge 108b. A controller of the system can have knowledge of the amount of each ingredient needed for a given recipe and cause the device to dispense the required amount of ingredient to a mixing area of the device. The mixing area can be formed on a bottom plate, such as plate 140, of the ingredient cartridge. Ingredients from the ingredient reservoirs 106 and solvent from ingredient cartridge 108a and ingredient cartridge 108b can flow from the respective reservoirs to the mixing area of the device 100. In specific embodiments of the invention, the ingredients from the ingredient reservoirs 106 flow to the mixing area via the controller opening and closing valves on a bottom side of the ingredient cartridge and ingredients from the ingredient cartridge flow to the mixing area via the controller actuating one or more pumps to pull the ingredients from the cartridges into the mixing area. Ingredients from ingredient cartridge 108a and/or ingredient cartridge 108b flow though the mixing area to "collect" the ingredients dispensed therein from the ingredient cartridge. In specific embodiments of the invention, ingredients from the ingredient cartridges (e.g., ingredient cartridge 108a and ingredient cartridge 108b) are allowed to enter the mixing area, and the ingredients from the ingredient reservoirs are dispensed directly into the ingredients from the ingredient cartridges already in the mixing area. In any case, an intermediate mixture of one or more ingredients can be formed in the mixing area of the device.

The term "intermediate mixture" is used herein to refer to a mixture being created in the mixing area of the device (for example in one or more mixing channels formed on plate 140) that is yet to be dispensed out of the mixing area and to a final dispense reservoir of the device. FIG. 1B illustrates a fluid outlet 142 of the cartridge. Fluid outlet 142 can be connected to the mixing area and allow the intermediate mixture formed therein to flow out to a final dispense reservoir 107. The final dispense reservoir can be any of the final dispense chambers described in U.S. Provisional Patent Application No. 63/146,461 filed Feb. 5, 2021, which is incorporated by reference herein in its entirety for all purposes.

When the access door 111 is closed, the final dispense reservoir 107 can be connected to the fluid outlet 142 of the cartridge via the fluid inlet 143. The ingredient(s) and/or solvent(s) that form the intermediate mixture can then enter the final dispense reservoir 107 via the inlet 143. Once in the final dispense reservoir 107, the intermediate mixture can be turned into the final fluid mixture to be dispensed by the device 100. In specific embodiments of the invention, the final fluid mixture is the intermediate mixture itself, as received from the mixing area. Alternatively, or in combination, the one or more ingredients and/or solvent(s) can flow from the mixing area to the final dispense reservoir 107 so that they are mixed as they flow into the final dispense reservoir to form the final fluid mixture. In specific embodiments of the invention, the final dispense reservoir is shaped so that the ingredient(s) and/or solvent(s) can be passively mixed as they flow into the mixing area. Alternatively, or in combination, the intermediate mixture can be further mixed with other ingredients (for example sugar water, carbonated water, etc.) in the final dispense reservoir to create the final fluid mixture. Alternatively, or in combination, the intermediate mixture can be submitted to other processes such as active mixing, temperature adjustments, carbonation, etc. in the final dispense reservoir 107 to create the final fluid mixture. The final fluid mixture can then be dispensed out the final dispense reservoir 107 and to the dispense area 104 via an outlet of the final dispense reservoir, as will be described in more detail in this disclosure.

In any case, the final dispense reservoir 107 can be configured to receive the ingredient(s) and or solvent(s) required for a given fluid mixture and hold the fluid mixture therein if needed (for example until all the components of the fluid mixture have been received and/or any mixing or other process has been performed). The final dispense reservoir can then be configured to dispense the fluid mixture out of the device and to a dispense area 104.

As described in the summary above, an ingredient cartridge for a fluid mixture dispensing device can comprise several portions with different degrees of reduction, reusability, and recyclability. In specific embodiments the portions can include an ingredient storage portion and a sturdy portion. The sturdy portion can be configured for handling or for mating with the fluid mixture dispensing device. The ingredient storage portion can be configured to contact and store the ingredient. In specific embodiments the portions can also include a shell that at least partially surrounds the ingredient storage portion. The shell can be configured to protect the ingredient storage portion from punctures or other damage. Various ingredient cartridges that are in accordance with these characteristics are described in detail herein.

In specific embodiments of the invention, a sturdy portion of an ingredient cartridge is configured to be handled by a user. The sturdy portion can be configured to withstand the force of being repeatedly mated with a cartridge mating interface of a fluid mixture dispensing device. The sturdy portion can include a device mating interface to align the cartridge with the device. In specific embodiments of the invention, the device mating interface and cartridge interface can form an air-tight connection through which the ingredient can flow into the device. The sturdy portion can be made of durable materials that have a high degree of reusability. The sturdy portion can be made of cork, wood, metal, or hard plastics such as acrylonitrile butadiene styrene (ABS), polycarbonate polyphenylsulfone, and ultra-high-molecular-weight polyethylene.

In specific embodiments of the invention a shell of an ingredient cartridge is less sturdy than the sturdy portion but has a higher degree of recyclability or is more reduced than the sturdy portion. In specific embodiments of the invention, a shell of an ingredient cartridge is connected to the sturdy portion of the ingredient cartridge. In specific embodiments of the invention, the shell is connected to both the sturdy portion of the ingredient cartridge and the ingredient storage portion. In specific embodiments of the invention the shell at least partially surrounds the ingredient storage portion. The shell can fully surround the ingredient storage portion. The shell can include a gap to allow the ingredient to be dispensed from the ingredient storage portion. For example, the ingredient storage portion can include a pipe, straw, spigot, or other extension which can extent through or be accessed from the gap. The shell can provide structural support to the ingredient storage portion. The shell portion can be recyclable or reusable. The shell can be recyclable and reusable. The shell portion can be more durable and less reduced that the ingredient storage portion. The shell portion can be reusable while the ingredient storage portion is not. The shell can be made of carious materials including the hard plastics mentioned above as well as cork, wood, molded pulp, cardboard, or fiber board.

In specific embodiments of the invention, a fluid storage portion of an ingredient cartridge is in contact with and stores the ingredient. The ingredient storage portion can store a liquid ingredient. The ingredient storage portion can be any reservoir. However, in specific embodiments of the invention, the ingredient storage portion is designed to compress as the ingredient is pulled out of the ingredient storage portion. For example, the ingredient storage portion could be a soft bag or other pliable reservoir. The storage portion can be a reduced component such as a thin plastic bag with a small-compressed volume and small mass while still having a large volume. For example, the storage portion can be a reduced component having a weight of less than 30 grams and an ability to hold 1.75 kilograms of liquid water. The storage portion can also be recyclable. The storage portion can be made of recyclable plastic such as polyethylene resin. The storage portion could be a small bag made of polyethylene film. Alternatively, the storage portion can be made of biodegradable plastic. For example, the storage portion could be made of compostable plastics such as compostable plastics made from polylactic acid. In specific embodiments of the invention, the fluid storage portion can be a recyclable fluid storage portion comprising a biodegradable plastic bag.

Figure 3:
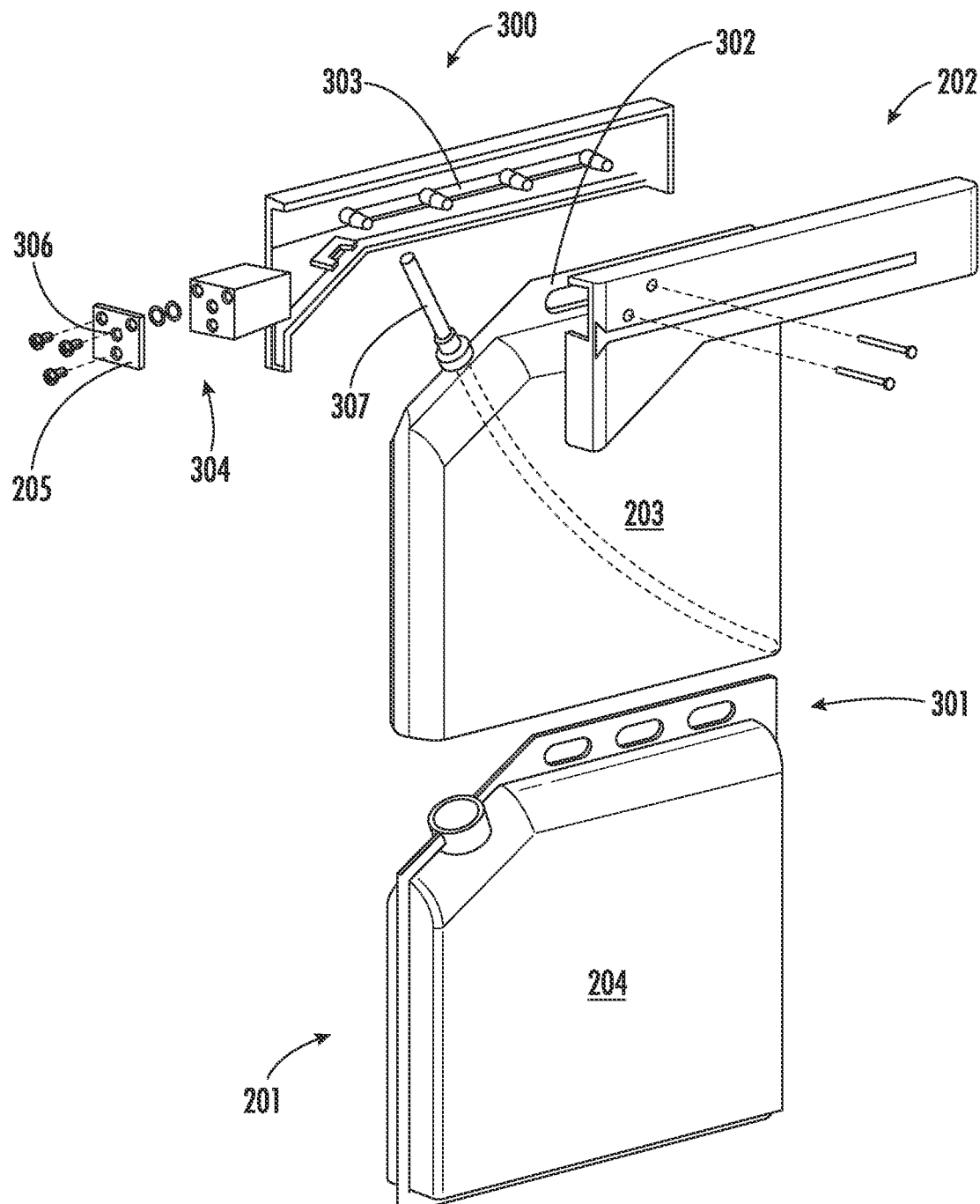
FIG. 3 illustrates an exploded view of the ingredient cartridge of FIG. 2, in accordance with specific embodiments disclosed herein.

FIG. 2 illustrates an example of an ingredient cartridge 201 for a fluid mixture dispensing device, in accordance with specific embodiments disclosed herein. The cartridge is shown in a perspective view 200 and a side view 250. The ingredient cartridge 201 could be used in a similar manner to ingredient cartridge 108a or ingredient cartridge 108b in FIG. 1B. FIG. 3 illustrates an exploded view 300 of the ingredient cartridge of FIG. 2, in accordance with specific embodiments disclosed herein. In the illustrated example, the cartridge 201 includes a sturdy portion 202, an ingredient storage portion in the form of fluid storage portion 203, and a shell 204. In the case of cartridge 201, the fluid storage portion 203 is made of biodegradable plastic, the recyclable shell 204 is made of molded pulp, and sturdy portion 202 is made of hard molded plastics and metal screws. The recyclable shell 204 protects the fluid storage portion 203 from being torn or punctured. The sturdy portion 202 is pushed by the user when the cartridge is slid into place in a fluid mixture dispensing device to form an air-tight interface.

The various portions of an ingredient cartridge can be attached in various ways. In specific embodiments of the invention, the sturdy portion can form at least a base of the ingredient cartridge with the fluid storage portion and shell located above the base. In specific embodiments of the invention, the sturdy portion can form at least a top of the ingredient cartridge with the fluid storage portion and shell located below the top. In specific embodiments of the invention, the fluid storage portion is a bag that rests on a bottom surface of the shell, and the fluid storage portion is not otherwise attached to the shell portion. However, the fluid storage portion could also be attached at a hole in the shell such as via a spigot or valve assembly that is connected to the hole and to the fluid storage portion. In specific embodiment of the invention, the fluid storage portion is a bag that is suspended from a top portion of the shell. In specific embodiments of the invention, the sturdy portion is on a top side of the shell and the fluid storage portion is a bag that is suspended from the fluid storage portion either directly through a direct connection between the fluid storage portion and the sturdy portion or indirectly through a connection to the shell which is in turn connected to the sturdy portion. The connections can be formed by various components such as hooks, hangers, snaps, magnets, adhesives, and various other fastening means. The connections can also be formed via common connection to a valve assembly. For example, the sturdy portion can include a valve assemble which is connected to a spigot or second valve assembly on the shell and/or fluid storage portion.

In the example of FIG. 3, sturdy portion 202 is connected to recyclable shell 204 by a set of three handles 301 formed on a top side of the recyclable shell 204. In specific embodiments, the sturdy portion can be connected to the recyclable shell and/or the fluid storage portion directly by at least one handle formed on the top side of the recyclable shell or a top side of the fluid storage portion. Furthermore, the recyclable fluid storage portion 203 is suspended from the sturdy portion 202 via another set of three handles 302 formed on a top side of the fluid storage portion. The two sets of handles are both suspended from hanger posts that are molded features 303 of the sturdy portion 202.

Certain combinations of the approaches disclosed above exhibit specific benefits. For example, if the sturdy portion forms at least a top of the cartridge and the ingredient storage portion is a bag suspended directly or indirectly from the sturdy portion, the ingredient will collect at a lowest point of the bag. In these embodiments a straw, such as straw 307, could extend to a lowest point of ingredient storage portion 203. The bag could be suspended at an angle, or the cartridge could be designed to rest at an angle when installed in the device, in order to assure that the ingredients pool at a predictable location within the device. In these embodiments, if the ingredient is pulled from the cartridge using a straw that extends into the ingredient storage portion, and the straw extends to that predicable location, the cartridge will be used to full depletion with little waste. As another example, if the ingredient storage portion is a bag or other flexible vessel in contact with a bottom surface of the cartridge, the bottom surface could be angled or patterned to assure that the ingredient pooled in a specific location to be removed by a straw or pooled towards a spigot or other valve assembly located on a bottom portion of the ingredient cartridge.

In specific embodiments, the ingredient cartridge can be configured to mate with a fluid mixture dispensing device. The cartridge can include a device mating interface for this purpose. The fluid mixture dispensing device can include a cartridge interface to mate with the device mating interface. The interfaces can include a mechanical element configured to bring the cartridge into alignment with the device and to create a line of communication for transferring the ingredient from the cartridge to the device. The interfaces can include a sliding interface. The interfaces can include a lock for keeping the cartridge in place. The interfaces can include a mechanical element for opening a portion of the ingredient cartridge. Such a mechanical element can conduct any action to form an interface with the cartridge include opening a flap, pushing a pin of a valve, interlocking two portions with complementary keying or other physical structure, and various other arrangements.

In specific embodiments of the invention, the device mating interface can be configured to form an air-tight seal with the cartridge mating interface and extend a line of air-tight communication from the ingredient storage portion to an interior of the fluid mixture dispensing device. The line of air-tight communication can include a straw the extends down into the ingredient storage portion. In specific embodiments of the invention, the cartridge can include a seal assembly in the sturdy portion and a straw having a first end connected to the seal assembly and a second end in the ingredient storage portion. In specific embodiments of the invention, the cartridge includes a seal assembly that connects directly to a spigot on the ingredient storage portion and a straw is not required. Regardless, the device can form an air-tight seal with the cartridge mating interface that extends from the ingredient to an interior of the device.

Using the types of interfaces described in the prior paragraph, and if the ingredients cartridge stores a liquid ingredient, fluid can then be removed from the ingredients cartridge and pulled into the device by decreasing a pressure inside the device using a pump or some other pressure source. The fluid can then flow through the air-tight interface from the ingredient storage portion into the device to be combined into a fluid mixture to be dispensed by the device. In specific embodiments of the invention, the fluid storage portion can be a bag or other compressible structure that is compressed as the fluid is withdrawn from the fluid storage portion into the device in this manner. A controller of the fluid mixture dispensing device can be programmed to cause the ingredient to flow from the ingredient cartridge through the cartridge mating interface and into the device. The controller can control how much of the ingredient is pulled in using through control of a pressure source and either a measurement of the ingredient volume in a feedback loop or from ex ante knowledge of how much of the ingredient is withdrawn in response to certain actions taken by the controller. In specific embodiments of the invention, the device mating interface can form a liquid connection with the ingredient cartridge on a bottom side of the cartridge, and no pressure, or less pressure, is required to pull the ingredient from the cartridge into the device.

Figure 4A:
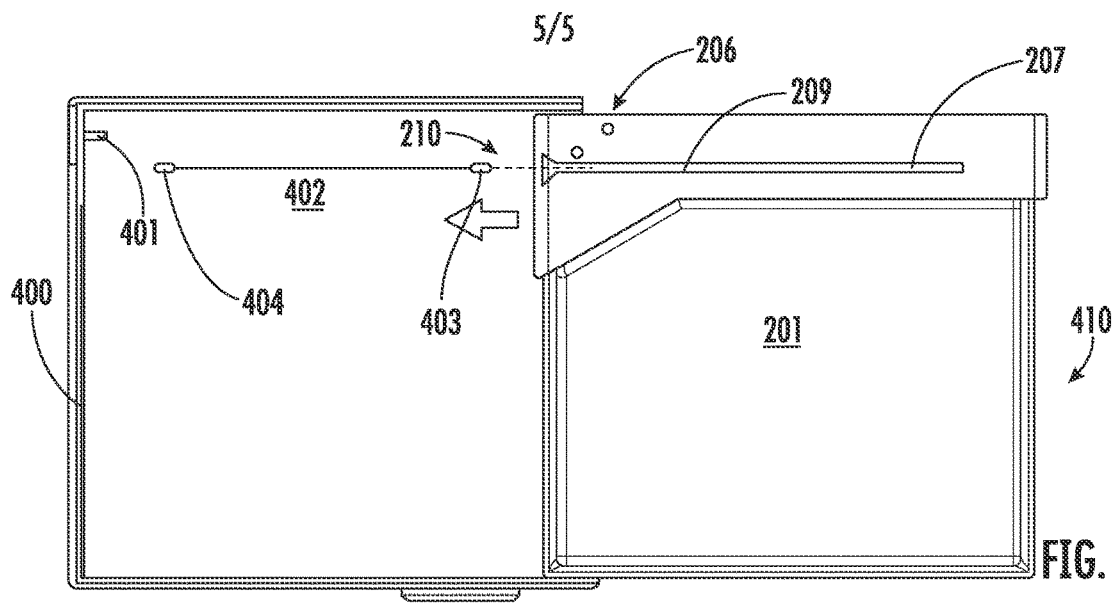
FIG. 4 illustrates an alignment feature for the ingredient cartridge of FIG. 2, in accordance with specific embodiments disclosed herein.
Figure 4B:
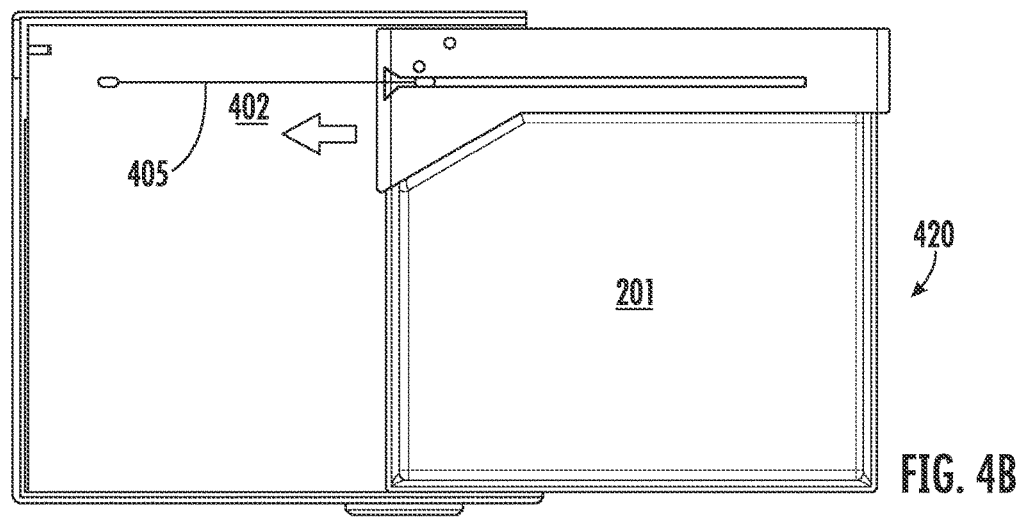
Figure 4C:
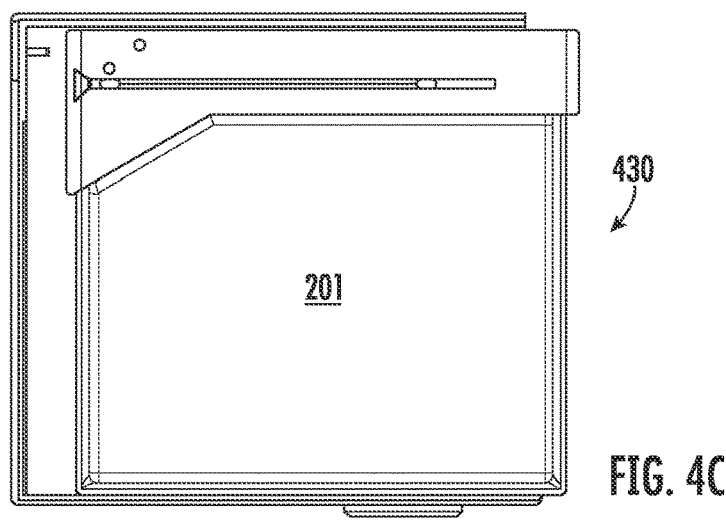

FIGS. 2 and 3 illustrate a device interface that is designed to align the cartridge and to from an air-tight seal with a cartridge mating interface on the device. The air-tight seal is formed when a pipe extending from the cartridge mating interface on the device extends into the illustrated orifice 306 on face plate 205 of valve assembly 304 and engages with the interior of valve assembly 304. The air-tight seal can be formed as the pipe extends through a pliable seal or set of seals which admit the pipe but form an airtight seal around the pipe to maintain an air-tight interface once the pipe has been admitted. An example of such a pipe is shown in FIG. 4 which illustrates cartridge mating interface 400 with pipe 401 extending from an interface surface.

In specific embodiments of the invention, the alignment of the cartridge and devices interfaces is an important aspect of the design because the interface is required to form an air-tight interface in a repeatable fashion with minimal wear and tear on the associated components to preserve reusability of those components. The air-tight interface can be formed by components of the sturdy portion of the ingredients cartridge which are intended to be used and reused many times in order to minimize the environmental impact of the cartridges. Accordingly, it is important to mate the two interfaces precisely so that the forces associated with forming an air-tight interface are not applied to the wrong portion of the cartridge or in such a way that they damage the sturdy portion of the device and any associated valve assembly.

In specific embodiments of the invention, the cartridge can be designed to slide into a cartridge interface that is narrowly tailored to the size of the cartridge such that it is aligned by being inserted into the interface. However, in alternative embodiments a sliding interface with a slide track assures better alignment given that it can be designed to minimize the effect of manufacturing tolerances on the alignment. In specific embodiments of the invention, a device mating interface of the ingredient cartridge can include a first slide track on a first side of a sturdy portion of the cartridge and a second slide track on a second side of the sturdy portion. The two slide tracks can be designed to interface with two sets of anchors on the cartridge interface of the device.

In specific embodiments of the invention in which the ingredient cartridge interfaces with the device in a sliding interface, the slide tracks can have wide mouths such that they can easily be aligned with the anchors of the cartridge interface. For example, the slide tracks can each have an angled mouth portion leading to a narrower neck portion. In specific embodiments of the invention, an opening of the angled mouth can be at least three times as wide as the first anchor to facilitate easy of alignment for the user. The resulting configuration can make initial alignment of the cartridge with the device easy for a user while the neck helps to align the cartridge more precisely with the device.

In specific embodiments of the invention in which the ingredient cartridge interfaces with the device in a sliding interface, a single rail surface of the cartridge interface can have two anchors. The rail surface is a surface of the cartridge interface along which the cartridge will slide while it is inserted into the device. In specific embodiments, the interfaces could be symmetrical on either side of the cartridge. The anchors can be the tallest protrusions on the rail surface and be configured to interface with the slide tracks of the device interface. The anchors can be spaced apart. The device interface can be configured to allow the cartridge to rotate along an axis perpendicular to the slide track when the slide track is only connected to the first anchor and lock out rotation along that axis once the slide track is connected to both anchors. Accordingly, the anchors can have a width that is close to the width of a neck portion of the slide track to allow for slight rotation when the first anchor is inserted but to start to align the cartridge for connection with the second anchor. In specific embodiments of the invention, the neck is less than ten percent wider than the first anchor.

In specific embodiments of the invention, the cartridge interface can include one or more features bridging the two anchors. For example, the anchors can include a raised bridge, raised up from the rail surface, which connects the two anchors. In specific embodiments of the invention, a line of spaced apart smaller raised features extend between the two anchors can serve the same purpose. The features can be configured to allow for certain degree of rotation but to limit rotation beyond that certain degree in order to guide alignment with the second anchor.

FIGS. 2, 3, and 4 illustrate a device interface and a cartridge interface in the form of a sliding interface that includes alignment features to bring the interfaces into alignment for purposes of forming an air-tight seal. FIG. 4 illustrates cartridge 201 being inserted into a cartridge interface 400 at three different points in time 410, 420, and 430. Cartridge interface 400 includes a rail surface 402 with a first anchor 403 for receiving a device mating interface 206 of the cartridge 201 and a second anchor 404 for receiving the device mating interface 206 of the cartridge. The first anchor 403 and the second anchor 404 extend from rail surface 402 and are the tallest protrusions (into the page) on the rail surface 402. While only one rail surface is shown, the rail surfaces on either side of the cartridge could be symmetric. Accordingly, the device mating interface 206 of the cartridge 201 could include a first slide track 207 on a first side of the sturdy portion 202 and a symmetrical second slide track on the opposite side of the sturdy portion 202.

At a first time 410, the device mating interface 206 is aligned with the cartridge interface 400 by a user grasping the cartridge 201. The device mating interface 206 includes a first slide track 207 with a wide angled mouth portion 210 leading to a narrow neck portion 209 on either side of cartridge 201. At first time 410 the wide angled mouth portion 210 allows a user a high degree of flexibility in aligning the cartridge with the device. As illustrated, an opening of the wide angled mouth portion 210 is at least three times as wide as the first anchor 403.

At second time 420, the device mating interface 206 has engaged with the cartridge interface as first anchor 403 is in the neck portion 209 of first slide track 207. As illustrated, the neck portion 209 is less than ten percent wider than the first anchor 403. As such, the cartridge can rotate slightly along an axis extending into the page. However, the cartridge has been brought into a fair degree of alignment with the device interface at this point. FIG. 4 also illustrates a bridge protrusion 405 located between the first anchor 403 and second anchor 404 that protrudes from rail surface 402 but that is narrower than the first anchor 403. The bridge protrusion 405 further limits rotation of that cartridge as the axis of rotation moves relative to the center of gravity of cartridge 201. As stated above, while bridge protrusion 405 is illustrated as a continuous element, in alternative approaches multiple independent bridge protrusions that are spaced apart could serve the same purpose.

At third time 430, the device mating interface has engaged with the cartridge interface to the point where both first anchor 403 and second anchor 404 are within neck portion 209 of first slide track 207. The result is a tight alignment which is just in time for the pipe 401 to align with orifice 306 and pierce the valves inside seal assembly 304 within the sturdy portion 202 of cartridge 201. The same alignment approach could be used for other interfaces that are formed through a compressive force. As illustrated, once the two anchors are both in neck portion 209 the possibility for rotation is significantly reduced to a degree set by the spacing of the anchors and the relative thicknesses of the anchors and the neck portion 209. The spacing of the illustrated approach, which has been found to produce good alignment, exceeds 150 mm.

A controller, as used in this disclosure, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as the information necessary to determine an amount of ingredient to obtain from a cartridge, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. An ingredient cartridge for a fluid mixture dispensing device, the ingredient cartridge comprising:
    a recyclable compressible fluid storage portion having at least one handle formed on a top side of the recyclable compressible fluid storage portion;
    a recyclable shell at least partially surrounding the recyclable compressible fluid storage portion and having at least one handle formed on a top side of the recyclable shell; and
    a sturdy portion attached to the recyclable shell and having (i) a device mating interface for a cartridge mating interface on the fluid mixture dispensing device and (ii) at least one hanger post configured to suspend the recyclable compressible fluid storage portion and the recyclable shell;
    wherein:
    the recyclable compressible fluid storage portion is suspended, from the at least one hanger post, by the at least one handle formed on the top side of the recyclable compressible fluid storage portion; and
    the recyclable shell is suspended, from the at least one hanger post, by the at least one handle formed on the top side of the recyclable shell.

2. The ingredient cartridge of claim 1, wherein the sturdy portion comprises:
    a first slide track on a first side of the sturdy portion; and
    a second slide track on a second side of the sturdy portion.

3. The ingredient cartridge of claim 2, wherein:
    the first slide track and the second slide track each have an angled mouth portion leading to a narrower neck portion.

4. The ingredient cartridge of claim 1, wherein:
    the recyclable compressible fluid storage portion is made of biodegradable plastic;

the recyclable shell is made of molded pulp; and
the sturdy portion is made of one of hard plastic and metal.

5. The ingredient cartridge of claim 1, wherein:
the recyclable compressible fluid storage portion comprises a biodegradable plastic bag; and
the biodegradable plastic bag rests on a bottom surface of the recyclable shell.

6. The ingredient cartridge of claim 1, wherein the device mating interface is configured to:
form an air-tight seal with the cartridge mating interface; and
extend a line of air-tight fluid communication from the recyclable compressible fluid storage portion to an interior of the fluid mixture dispensing device.

7. The ingredient cartridge of claim 1, further comprising:
a seal assembly in the sturdy portion; and
a straw having a first end connected to the seal assembly and a second end in the recyclable compressible fluid storage portion.

8. The ingredient cartridge of claim 7, wherein:
the straw extends to a lowest point of the recyclable compressible fluid storage portion.

9. A fluid mixture dispensing device comprising:
an ingredient cartridge comprising:
a recyclable compressible fluid storage portion having at least one handle formed on a top side of the recyclable compressible fluid storage portion;
a recyclable shell at least partially surrounding the recyclable compressible fluid storage portion and having at least one handle formed on a top side of the recyclable shell;
a sturdy portion attached to the recyclable shell and having (i) a device mating interface and (ii) at least one hanger post configured to suspend the recyclable compressible fluid storage portion and the recyclable shell;
a cartridge mating interface mated to the device mating interface; and
a controller programmed to cause an ingredient to flow from the ingredient cartridge through the cartridge mating interface;
wherein:
the recyclable compressible fluid storage portion is suspended, from the at least one hanger post, by the at least one handle formed on the top side of the recyclable compressible fluid storage portion; and
the recyclable shell is suspended, from the at least one hanger post, by the at least one handle formed on the top side of the recyclable shell.

10. The fluid mixture dispensing device of claim 9, wherein the cartridge mating interface is a sliding cartridge mating interface and comprises:
a first anchor for receiving the device mating interface of the ingredient cartridge;
a second anchor for receiving the device mating interface of the ingredient cartridge;
a rail surface;
wherein the first anchor and the second anchor extend from the rail surface; and
wherein the first anchor and the second anchor are the tallest protrusions on the rail surface.

11. The fluid mixture dispensing device of claim 10, wherein the sliding cartridge mating interface further comprises:
one or more bridge protrusions: (i) that are located between the first anchor and the second anchor; (ii) that protrude from the rail surface; and (iii) that are narrower than the first anchor.

12. The fluid mixture dispensing device of claim 10, wherein the sturdy portion comprises:
a first slide track on a first side of the sturdy portion; and
a second slide track on a second side of the sturdy portion.

13. The fluid mixture dispensing device of claim 12, wherein:
the first slide track and second slide track each have an angled mouth portion leading to a narrower neck portion;
an opening of the angled mouth portion is at least three times as wide as the first anchor; and
the narrower neck portion is less than ten percent wider than the first anchor.

14. The fluid mixture dispensing device of claim 9, wherein:
the recyclable compressible fluid storage portion is made of biodegradable plastic;
the recyclable shell is made of molded pulp; and
the sturdy portion is made of one of hard plastic and metal.

15. The fluid mixture dispensing device of claim 9, wherein:
the recyclable compressible fluid storage portion comprises a biodegradable plastic bag; and
the biodegradable plastic bag rests on a bottom surface of the recyclable shell.

16. The fluid mixture dispensing device of claim 9, wherein the device mating interface is configured to:
form an air-tight seal with the cartridge mating interface; and
extend a line of air-tight fluid communication from the recyclable compressible fluid storage portion to an interior of the fluid mixture dispensing device.

17. The fluid mixture dispensing device of claim 9, further comprising:
a seal assembly in the sturdy portion; and
a straw having a first end connected to the seal assembly and a second end in the recyclable compressible fluid storage portion.

18. The fluid mixture dispensing device of claim 17, wherein:
the straw extends to a lowest point of the recyclable compressible fluid storage portion.

19. A fluid mixture dispensing device comprising:
an ingredient cartridge comprising:
a recyclable compressible fluid storage portion having at least one handle formed on a top side of the recyclable compressible fluid storage portion;
a recyclable shell at least partially surrounding the recyclable compressible fluid storage portion and having at least one handle formed on a top side of the recyclable shell; and
a sturdy portion attached to the recyclable shell and having (i) a device mating interface and (ii) at least one hanger post configured to suspend the recyclable compressible fluid storage portion and the recyclable shell; and
a sliding cartridge mating interface on the fluid mixture dispensing device, the sliding cartridge mating interface comprising:
a first anchor for receiving the device mating interface;
a second anchor for receiving the device mating interface; and
a rail surface;
wherein:

the first anchor and the second anchor extend from the rail surface; and the first anchor and the second anchor are the tallest protrusions on the rail surface;

the recyclable compressible fluid storage portion is suspended, from the at least one hanger post, by the at least one handle formed on the top side of the recyclable compressible fluid storage portion; and the recyclable shell is suspended, from the at least one hanger post, by the at least one handle formed on the top side of the recyclable shell.

20. The fluid mixture dispensing device of claim 19, wherein the sliding cartridge mating interface further comprises:

one or more bridge protrusions: (i) that are located between the first anchor and the second anchor; (ii) that protrude from the rail surface; and (iii) that are narrower than the first anchor.

\* \* \* \* \*